United States Patent
Ramesh et al.

(10) Patent No.: US 12,518,284 B2
(45) Date of Patent: Jan. 6, 2026

(54) MACHINE LEARNING MODEL AND NARRATIVE GENERATOR FOR PROHIBITED TRANSACTION DETECTION AND COMPLIANCE

(71) Applicant: PAYPAL, INC., San Jose, CA (US)

(72) Inventors: Venkatesh J. Ramesh, Madurai (IN); Rajkumar Baskaran, Vellore (IN); Swaminathan Raghavan, Chennai (IN)

(73) Assignee: PAYPAL, INC., San Jose, CA (US)

( * ) Notice: Subject to any disclaimer, the term of this patent is extended or adjusted under 35 U.S.C. 154(b) by 69 days.

(21) Appl. No.: 18/313,039

(22) Filed: May 5, 2023

(65) Prior Publication Data

US 2023/0360052 A1 Nov. 9, 2023

Related U.S. Application Data

(63) Continuation of application No. 16/833,475, filed on Mar. 27, 2020, now Pat. No. 11,682,018.

(51) Int. Cl.
 *G06Q 20/40* (2012.01)
 *G06F 18/21* (2023.01)
 *G06N 20/00* (2019.01)
(52) U.S. Cl.
 CPC ....... *G06Q 20/4016* (2013.01); *G06F 18/217* (2023.01); *G06N 20/00* (2019.01)

(58) Field of Classification Search
 CPC .................. G06Q 20/4016; G06F 18/217
 USPC .......................................... 705/75
 See application file for complete search history.

(56) References Cited

U.S. PATENT DOCUMENTS

| | | |
|---|---|---|
| 7,246,090 B1 | 7/2007 | Thomas |
| 2013/0320097 A1 | 12/2013 | Anderson, II et al. |
| 2015/0142595 A1 | 5/2015 | Acuna-Rohter |
| 2019/0205885 A1 | 7/2019 | Lim et al. |
| 2019/0236607 A1 | 8/2019 | Formsma et al. |
| 2020/0387835 A1 | 12/2020 | Sandepudi et al. |

*Primary Examiner* — Lindsay M Maguire
(74) *Attorney, Agent, or Firm* — Haynes and Boone, LLP

(57) ABSTRACT

There are provided systems and methods for a machine learning model and narrative generator for prohibited transaction detection and compliance. A service provider server, such as an electronic transaction processor, may generate a machine learning model using a supervised training technique, which may detect transactions that may be money laundering. The model may be iteratively trained by detecting flagged transactions and outputting those transactions to an agent for identification of false positives, which may be used to retrain the model. When outputting the flagged transactions, a narrative may be generated using an explainer graph and a machine learning prediction explainer that identifies the features of the transaction data that caused the transactions to be flagged. Further, once the model is trained additional transactions may be processed to determine whether the features of those transactions indicate prohibited behavior.

20 Claims, 4 Drawing Sheets

MACHINE LEARNING MODEL AND NARRATIVE GENERATOR FOR PROHIBITED TRANSACTION DETECTION AND COMPLIANCE

CROSS-REFERENCE TO RELATED APPLICATIONS

This application claims priority to and is a continuation of U.S. patent application Ser. No. 16/833,475, filed Mar. 27, 2020, all of which is incorporated herein by reference in its entirety.

TECHNICAL FIELD

The present application generally relates to machine learning models trained for prohibited transaction detection and more particularly to an engine having a machine learning model trained to detect potential money laundering transactions and output a narrative of why the transaction was flagged by the engine, according to various embodiments.

BACKGROUND

Service providers may provide electronic transaction processing services to users, which may be used to send and receive funds with other entities. Some of these services may be used maliciously or fraudulently by users, such as to conduct money laundering schemes. However, these service providers may process thousands (or more) transactions daily, which may be difficult to review without a large review and compliance team. Therefore, Applicant recognizes that initial data processing may be required to identify potential money laundering transactions or other prohibited transactions. Further, when reviewing the data of potentially money laundering transactions, agents may not be able to determine or decipher the underlying data as to why the transaction may be a money laundering transaction. Thus, the decisions made about which transactions are flagged for regulatory review may not clear to different parties reviewing the flagged transaction.

Figure 1:
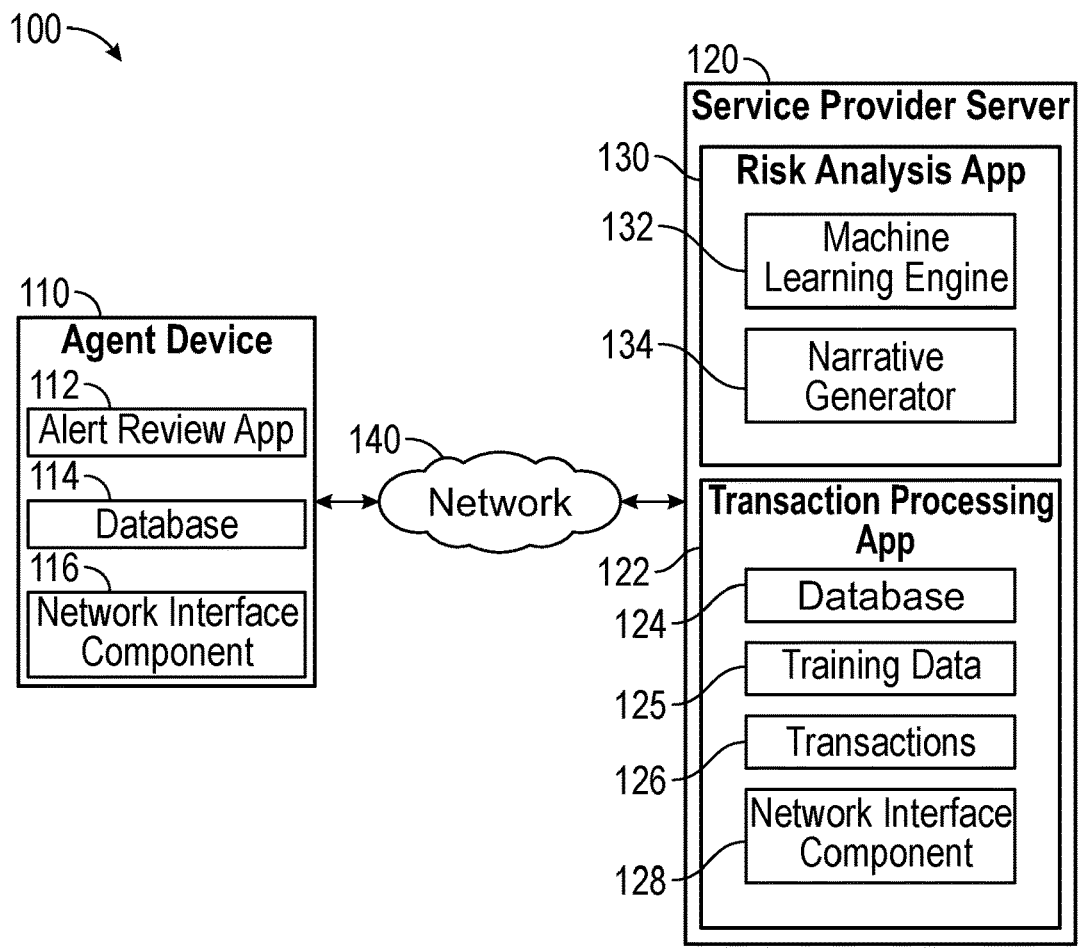
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for a machine learning model and narrative generator for prohibited transaction detection and compliance. Systems suitable for practicing methods of the present disclosure are also provided.

A service provider server, which may provide a prohibited transaction detection platform, may train a machine learning model through iterative training on a training data set. In this regard, a machine learning technique, such as gradient boosting or random forest algorithms, may be used to detect flagged transactions within the training data set that indicate potential fraud. These may be then reviewed by an agent to determine whether the flags may be false positives where the transactions were flagged but do not indicate fraud to a sufficient level to require reporting to a regulatory body (e.g., an authority that handles money laundering offenses and transactions). Once the false positives have been identified and used to retrain the model iteratively, the model may then provide more accurate results for prohibited transaction detection. Thereafter further transactions may be processed using the model to identify and flag any transactions for potential money laundering or other fraud.

Further, the service provider server may provide a process to generate narratives automatically for review by the agents when reviewing flagged transactions for false positives and/or submission to a regulatory agency. The narrative may be generated by the server by using a machine learning prediction explainer that generates an explanation (which may be partially or wholly in graph form) of what factors caused the machine learning model to flag the transaction. For example, the explanation graph may rank and/or provide values for each factor that influenced the decision of the machine learning engine to flag the transaction and/or account sending or receiving money in the transactions based on the features of the data (e.g., transaction amount, time, number of transactions between accounts, etc.). Using the machine learning prediction explainer, a textual narrative may then be generated, which explains the features that caused the flag. This may be displayed with the flagged transaction so that users may view a textual reason explaining why the engine and model flagged the transaction. The provided explanation text can aid a human reviewer, in various instances, in rapidly making a decision as to whether a flagged transaction should be sent to regulatory authority for additional review. (Note that in various jurisdictions, it is a requirement that a human provide a decision as to whether a prohibited transaction such as money laundering has occurred.)

In this regard, a service provider may provide electronic transaction processing to entities, such as users that may utilize the services of the service provider for both legitimate, fraudulent, and/or malicious purposes (e.g., money laundering). A user may correspond to some entity, such as consumers, merchants, etc., that may interact with the service provider to establish an account and utilize the account for transaction processing. An account with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information. The user may also be required to provide financial information, including payment card (e.g., credit/debit card) information, bank account information, gift card information, benefits/incentives, and/or financial investments, which may be used to process transactions after identity confirmation. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services.

Thus, the online service provider may provide account services to users of the online service provider, which may be used to process electronic transactions. When processing transactions, accounts may generate transaction data, which may include transaction histories and may be accrued for each account in a transaction history or other account data. The service provider may therefore include large databases and stores of processed transaction data, which may include both legitimate or valid transactions and those transactions that may be fraudulent due to money laundering, theft, and other illegal or malicious activities. Further, the service provider may have access to other transaction data, including training data of transactions that were processed by the service provider or another entity. For example, the service provider may also have access to data processed by a regulatory agency of received transactions indicating money laundering by the service provider and/or other entities, as well as the actions taken by the regulatory agency to enforce laws, rules, or regulations (e.g., transactions that led to money laundering counteractions or were dismissed for lack of evidence or incorrect flagging). In order to identify those transactions that are money laundering, human agents might have to identify those transactions that were anomalous, irregular, or indicating fraud or otherwise prohibited behavior based on individual transactions and/or patterns of behavior for accounts when transacting. However, the money laundering transactions may only make up a portion of the overall transactions, and further the overall transactions processed within a time period may include thousands or millions of transactions. Therefore, it previously was inefficient to have human agents reviewing all transactions within a data set.

Therefore, a machine learning engine may predict patterns of money laundering or irregular behavior that may be indicative of money laundering or other illegal or malicious conduct. In this regard, a training data set may be used, where the training data set may include transactions having a number of features. The features may include a type of system for the entity conducting the transaction (e.g., mobile device, web, etc.), an account number, a transaction identifier (ID), a transaction type (e.g., payment, gambling, etc.), an encrypted transaction ID, a parent transaction ID, a created and/or update date, a US dollar equivalent amount (e.g., where credits and sent payments may be in a negative format), a local currency amount and/or code, a billing and/or shipping address, a funding source and/or backup funding source, a bank account number, a bank hash-based message authentication code (HMAC), a card number and/or hash, a card bun HMAC, a card issuer, a balance and/or impact on a balance due to the transaction, a transaction status and/or items within the transaction, notes and/or subject lines within messages for the transaction, an automated clearinghouse return codes, an ID on another marketplace or platform, a counterparty name, a counterparty account number, a counterparty account type, a counterparty country code, a counterparty email, a counterparty transaction ID, a counterparty ID on a marketplace or platform, a counterparty account status, a referring URL, an IP address, whether the transaction was successful, and a date (e.g., month/year) of transaction. However, other features of the data set may also be used and processed to train a machine learning engine and/or identify flags on transactions within a data set.

Using the training data set, a machine learning technique may be applied to classify the transactions within the data set. The machine learning technique may include gradient boosting, such as XGBoost, or random forest algorithms. In this regard, the algorithms may generate decision trees that are utilized to understand the data. The algorithms may correspond to supervised processes that are used with data to place transactions in different classifications based on classifiers for a machine learning model, such as "Prohibited" and "Not Prohibited." The training data may be labeled or may be on data having known patterns (e.g., valid transactions and/or prohibited transactions), and the process may include agent feedback on transactions that are flagged, such as whether they are properly flagged and what indicates potential fraud for submission to a regulatory body or authority. The model may be trained and utilized by a neural network to make classifications, where a hidden layer of the network may be trained with different values or attributes derived from the input values by the machine learning model. The nodes of the hidden layers may have different values and weights assigned based on the machine learning algorithm applied to the input layer features, as discussed further below. Using the training data, the resulting network may be generated that classifies the input data in the output layer, such as by determining whether money laundering is indicated in transactions.

When first training the model, feedback may be useful from an agent to indicate whether the flagged transactions detected by the machine learning engine are actually indicative of a prohibited transaction or whether a false positive due to certain factors occur. For example, a coach may be paid $1,000 monthly for tennis lessons by an athlete, where this type of repetitive transaction, amount, and description may raise concerns of money laundering. However, this may be an entirely legitimate transaction. Thus, the machine learning engine may classify a particular transaction, set of transactions, and/or accounts as potentially money laundering due to particular features of the data, the machine learning model's factors, weights, and/or values, and the particular machine learning algorithm used to train the model. In order to allow for agent review of the particular transaction in a coherent and straightforward manner (e.g., without reviewing the underlying machine learning decision-making factors, values, and/or graphs, which may be difficult for some agents), the service provider's engine may utilize a machine learning prediction explainer to generate a textual narrative based on an explanation graph for why the machine learning model flagged the particular transaction. For example, the explanation graph may include factors that weighed in favor of the decision, and may rank those factors as well as an overall rank, threshold, or score comparison that led to the transaction being flagged.

A narrative text generator may then generate text, which may show account identification, account balances and/or changing balances over a time period, and an explanation and identification of one or more of the factors that led to the money laundering flag. For example, the narrative text generator may show top 3 factors, such as counterparty identification, amount, and time/date/recurrence of the transactions that indicate potential fraud or other prohibited behavior by an account. Once this textual narrative is generated, the text may be fed into a case management system that allows agents to review the flagged transaction. Thereafter, an agent may provide further feedback on whether there are any false positives on the data. This may correspond to an iterative training of the machine learning model on previous false positives so that the false positives may be reduced and/or eliminated through successive training of the model using the supervised machine learning algorithm, the flagged transactions, and the false positives.

Accordingly, the machine learning model may be built and implemented in a service and/or engine of one or more service providers for detection for fraud. This allows service providers to quickly identify a prohibited transaction without being required to have live agents individually review transaction data. Thus, these automated processes allow for faster and more efficient review of data, while reducing false positives using iterative training of the model so that legitimate users are not affected. Furthermore, by using a narrative text generator, an agent may quickly and efficiently review the engine's reason for taking such action to determine whether the model is behaving correctly or may have mis-classified some data. Thus, the number of resources utilized to detect money laundering patterns may be reduced.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity System 100 includes an agent device 110 and a service provider server 120 in communication over a network 140. Agent device 110 may be utilized to provide training data, view flagged transactions, and process additional transaction data to identify transactions indicating a prohibited transaction including potential money laundering. In this regard, an agent may process and review the data with service provider server 120, where service provider server 120 may generate a machine learning model based on iteratively training using the training data, and further process the transaction data using the model to flag further transactions. Additionally, service provider server 120 may be used to output narratives for flagged transactions based on feature analysis that caused the machine learning engine to perform a classification.

Agent device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Agent device 110 may be implemented as a communication device that may utilize appropriate hardware and software configured for wired and/or wireless communication with service provider server 120. For example, in one embodiment, agent device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one device is shown, a plurality of devices may function similarly and/or be connected to provide the functionalities described herein.

Agent device 110 of FIG. 1 contains an alert review application 112, a database 114, and a network interface component 116. Alert review application 112 may correspond to executable processes, procedures, and/or applications with associated hardware. In other embodiments, agent device 110 may include additional or different modules having specialized hardware and/or software as required.

Alert review application 112 may correspond to one or more processes to execute software modules and associated components of agent device 110 to provide features, services, and other operations associated with training a machine learning, deep learning, or other artificial intelligence (AI) model, as well as using the model for detection of prohibited transactions in transaction data sets. In this regard, alert review application 112 may correspond to specialized hardware and/or software utilized by a user of agent device 110 that may be used to provide training and transaction data, as well as review results of a supervised machine learning engine having a model trained for fraudulent pattern recognition and narrative text output. For example, alert review application 112 may be used to first provide training data and/or sets of data to service provider server 120 that includes transaction data sets for transaction processed by a financial entity, such as a bank or financial institution, payment service provider, or other transaction processor. Service provider server 120 may utilize features within the data sets to classify the transactions according to one or more classifiers, which may flag one or more transactions as potentially prohibited based on laws, rules, or regulations. The data sets may be annotated, and flagged transactions may be displayed through alert review application 112. An agent may identify any false positives in the flagging of transactions as potentially prohibited, which may be provided back to service provider server 120 for retraining (e.g., iteratively and/or continuously training) of the machine learning model. The flagged transactions may include a narrative displayable through alert review application 112, such as a textual description of the reason for flagging the transaction(s) by the model. After training, agent device 110 may further be used to view the results of the model processing other transaction data sets, such as for other transaction processed by one or more entities.

Agent device 110 may further include database 114 stored on a transitory and/or non-transitory memory of agent device 110, which may store various applications and data and be utilized during execution of various modules of agent device 110. Database 114 may include, for example, identifiers such as operating system registry entries, cookies associated with alert review application 112 and/or other applications 112, identifiers associated with hardware of agent device 110, or other appropriate identifiers, such as identifiers used for payment/user/device authentication or identification, which may be communicated as identifying the user/agent device 110 to service provider server 120. Database 114 may further include any transaction data sets used for training and/or processing with a machine learning model generated by service provider server 120.

Agent device 110 includes at least one network interface component 116 adapted to communicate with service provider server 120. In various embodiments, network interface component 116 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide identification of prohibited transactions, such as money laundering transactions, in transaction data sets processed by a financial or transaction processing entity (including service provider server 130) using a machine learning or other AI model. In this regard, service provider server 120 includes one or more processing applications which may be configured to interact with agent device 110 to train and utilize the model for prohibited transaction identification. In one example, service provider server 120 may be provided by PAYPAL®, Inc. of San Jose, CA, USA. However, in other embodiments, service provider server 120 may be maintained by or include another type of service provider.

Service provider server 120 of FIG. 1 includes a risk analysis application 130, a transaction processing application 122, a database 124, and a network interface component 128. Risk analysis application 130, transaction processing application 122, and other applications 134 may correspond to executable processes, procedures, and/or applications with associated hardware. In other embodiments, service provider server 120 may include additional or different modules having specialized hardware and/or software as required.

Risk analysis application 130 may correspond to one or more processes to execute modules and associated specialized hardware of service provider server 120 to provide a framework to train a machine learning model using for one or more engines that detect fraud in transaction data sets. In this regard, risk analysis application 130 may correspond to specialized hardware and/or software used by a user associated with agent device 110 to train machine learning engine 132. Machine learning model 132 includes one or more executable programs and/or models configured to initially process one or more training data sets having transactions processed by an entity, including service provider server 120. The transactions in the training data set(s) may include legitimate transactions and malicious and/or fraudulent transactions, such as those transactions prohibited due to money launder laws, rules, and regulations when entity engage in illegal and/or malicious behavior. The training data set may include labeled and/or unlabeled data, which may include classifications of valid transactions and prohibited transactions (e.g., "no money laundering" or "potential or detected money laundering," respectively). These may be labeled by a human operator, such as an agent that reviews transactions for money laundering, fraud, and the like for reporting to a regulatory agency, body, or entity. Thus, one or more classifiers may be established by the agent or entity processing the data, or may be determined based on outlier transactions or transactions having features indicating prohibited conduct or behavior. Thus, the classifiers may be built and trained so that classifications may be assigned to particular data points (e.g., transactions) within the training data set.

The training data set(s) include different features, such as a platform for the transaction (e.g., mobile, web, etc.), an account number, a transaction identifier (ID), a transaction type (e.g., payment, gambling, etc.), an encrypted transaction ID, a parent transaction ID, a created and/or update date, a US dollar equivalent amount (e.g., where credits and sent payments may be in a negative format), a local currency amount and/or code, a billing and/or shipping address, a funding source and/or backup funding source, a bank account number, a bank hash-based message authentication code (HMAC), a card number and/or hash, a card bun HMAC, a card issuer, a balance and/or impact on a balance due to the transaction, a transaction status and/or items within the transaction, notes and/or subject lines within messages for the transaction, an automated clearinghouse return codes, an ID on another marketplace or platform, a counterparty name, a counterparty account number, a counterparty account type, a counterparty country code, a counterparty email, a counterparty transaction ID, a counterparty ID on a marketplace or platform, a counterparty account status, a referring URL, an IP address, whether the transaction was successful, and a date (e.g., month/year) of transaction.

Other exemplary features and/or categories of features in the training data that may be important to training the values and weights of a machine learning model may include risk rules regarding flagging of transactions as incorrect descriptions or messages, complaints and flags by other parties within transactions, gambling activities including fantasy sports, specific country accounts and transaction activities from countries marked as high risk for money laundering and/or fraud, a same or similar account owner for a sender and receiver in a transaction, counterfeit flagged accounts, volume of payments in a high risk transaction corridor or category, a spike in activity or transaction value after a dormant or inactive period, a number of transactions and total amount (including if the transactions were cross-border transactions), a previous account takeover flag, a malicious seller flag, an account restriction due to previous malicious use or rule violation, a cross-border payment from a device using in-person payment instrument processing (e.g., through processing a payment card EMV chip or magnetic stripe to provide the payment), a check deposit amount and transfer of deposited funds, a deposit and withdrawal/transfer of all or a substantial portion of the deposit within a time period, a gift card usage and withdrawal/transfer of such funds, a premier account usage and activity/inactivity, and/or a number of transactions between the same parties.

Figure 2:
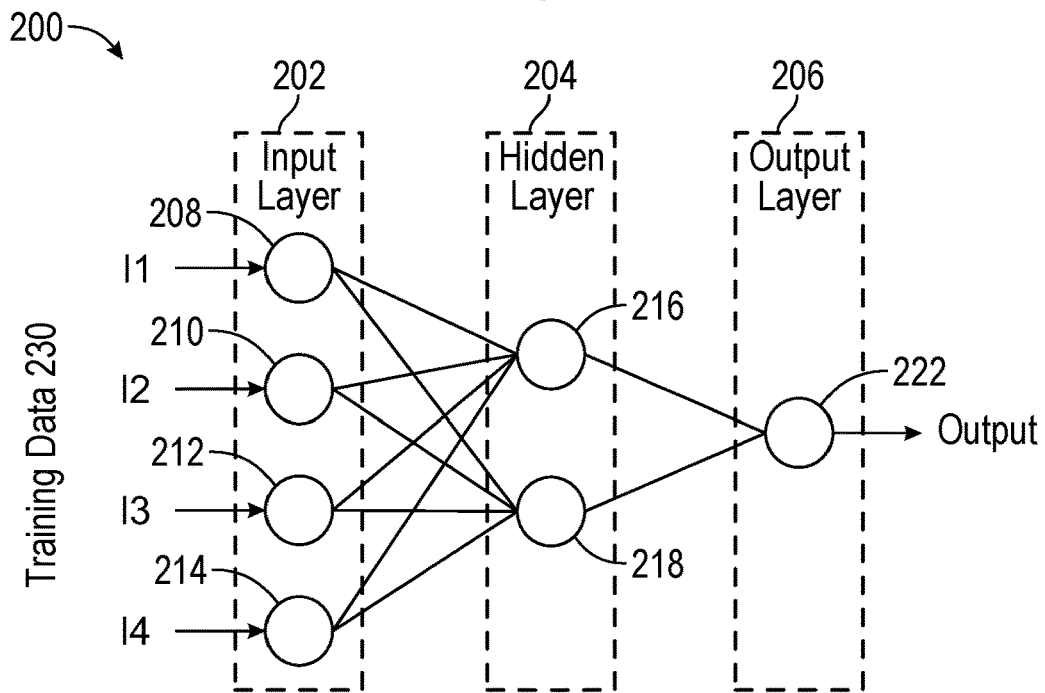
FIG. 2 is an exemplary system environment of an artificial neural network implementing a machine learning model trained for classifications based on training data, according to an embodiment.

When generating machine learning engine 132, the features in the training data set(s) may be used to generate different layers of a machine learning model used to detect the prohibited transactions, which may include different nodes, values, weights, and the like, as discussed in reference to an exemplary machine learning model of FIG. 2. Machine learning engine 132 may utilize a supervised machine learning algorithm, function, or technique that utilizes continuous and/or iterative learning to generate the model. In some embodiments, the algorithm and technique to generate the model of machine learning engine 132 may correspond to a deep learning network, including a convolution neural network, a recurrent neural network, or a deep neural network. When training the model, risk analysis application 130 may utilize feedback and annotations or labeling from an agent to iteratively train the model. For example, transactions in the training data set and/or other data sets may be flagged using the machine learning technique to identify prohibited transactions, where the agent may indicate that the flagged transactions were not actually prohibited (e.g., not indicative or including money laundering). Identification of these false positives may be used to retrain the model of machine learning engine 132 in a continuous and/or iterative process so that false positives may be reduced and/or eliminated and machine learning engine 132 may more accurately predict and detect money laundering or other prohibited transactions. Thus, risk analysis application 130 and/or machine learning engine 132 is trained for detection of prohibited transactions, as well as review of results from machine learning engine 132 that has been modeled for prohibited transaction detection.

When training machine learning engine 132 and/or processing other transaction data sets, a narrative generator 134 may also be used by risk analysis application 130 to provide a textual and/or visual explanation of why machine learning engine 132 identified certain transactions as prohibited. This explanation and narrative may assist the agents reviewing transactions flagged as prohibited in determining whether the transactions are prohibited. For example, narrative generator 134 may utilize, as input, an output graph from a machine learning prediction explainer and/or a neural network prediction explainer (e.g., local interpretable model-agnostic explanations (LIME) or SHapley Additive exPlanations (SHAP)). The output graph may include a feature importance of each feature in the flagged transactions (or unflagged transactions, as necessary for agent review), where the feature importance includes data indicating how important the feature was in classifying the transaction (e.g., flagging the transaction as prohibited or not). The output graph may therefore include data showing how the model utilizes the classifiers to classify data points within the training data. Using the output graph, narrative generator may then generate a narrative, which may be output with the flagged (or unflagged) transactions to display why machine learning engine 132 made particular decisions or predictions.

Transaction processing application 122 may correspond to one or more processes to execute modules and associated specialized hardware of service provider server 120 to process a transaction, which may include transactions used for training data for training a machine learning model by risk analysis application 130 or otherwise processing the transaction data to identify transactions flagged as prohibited by the machine learning model. In this regard, transaction processing application 122 may correspond to specialized hardware and/or software used by a user to establish a payment account and/or digital wallet, which may be used to generate and provide user data for the user, as well as process transactions. In various embodiments, financial information may be stored to the account, such as account/card numbers and information. A digital token for the account/wallet may be used to send and process payments, for example, through operations provided by service provider server 120. In some embodiments, the financial information may also be used to establish a payment account. The payment account may be accessed and/or used through a browser application and/or dedicated payment application to engage in transaction processing through transaction processing application 122 that generates transactions used for training a machine learning or other AI model for prohibited transaction identification. Transaction processing application 122 may process the payment and may provide a transaction history that is used for transaction data in transaction data sets used to train and utilize the model for prohibited transaction identification.

Additionally, service provider server 120 includes database 124 according to various embodiments. Database 124 may store various identifiers associated with agent device 110. Database 124 may also store account data, including payment instruments and authentication credentials, as well as transaction processing histories and data for processed transactions. Database 124 may store financial information and tokenization data. Database 124 may further store data necessary for training and utilizing a machine learning model, such as training data 125 that may include transactions used to train a machine learning or AI model and any false positive feedback from an agent. Further database 124 may include transactions 126 used for training a model for processing future transactions by service provider server 120 or another transaction processing entity, where transactions 126 may be processed by the model to identify prohibited transactions. Database 124 may further include narratives for training data 125 and/or transactions 126 generated by the model and model explainer that includes a description of why the model flagged particular transactions as prohibited.

In various embodiments, service provider server 120 includes at least one network interface component 128 adapted to communicate agent device 110 and/or other entities over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

FIG. 2 is an exemplary system environment of an artificial neural network 200 implementing a machine learning model trained for classifications based on training data, according to an embodiment. In this regard, neural network 200 shows an input layer 202, a hidden layer 204, and an output layer 206 of the artificial neural network implementing a machine learning model trained as discussed herein, where the nodes and weights for the hidden layer may be trained using one or more training data sets of transactions for identification of patterns of prohibited conduct or behavior in transaction performance (e.g., transaction processing between users or other entities).

For example, when training machine learning engine 132, one or more training data sets of training data 230 for transactions having different features and feature values may be processed using a supervised machine learning algorithm or technique, such as gradient boosting or random forest algorithms. In some embodiments, other types of AI learning may be used, such as deep learning for neural networks. The features within training data 230 may include different types of variables, parameters, or characteristics of the underlying transactions, which may have separate values to the variables. This allows for different classifiers of the transactions and variables to be built into known or desired classifications (e.g., "prohibited transaction" or "flagged transaction for review"). These classifiers are trained to detect the transactions of training data 230 falling into the classifier using the machine learning technique, which allows identification of similar transactions meeting a specific classification. The classifiers may be generated by the machine learning technique when identifying and grouping transactions and/or designated by a user or agent of the training data set. Thus, training data 230 may include transactions falling into specific classifications, such as prohibited transactions and valid or not prohibited transactions. The process may be supervised where the output and classifications are known for the transactions. In some embodiments, the training data set may include annotated or labeled data of particular flagged transactions and/or may be reviewed after processed and classified by the machine learning technique for false positives and/or correctly identified and flagged as prohibited transactions.

Neural network 200 may therefore implement a machine learning model of machine learning engine 132 (e.g., a model trained using training data 230 of transactions having potentially prohibited transactions). Neural network 200 includes different layers and nodes to perform decision-making using the machine learning model. Each of layers 202, 204, and 206 may include one or more nodes. For example, input layer 202 includes nodes 208-214, hidden layer 204 includes nodes 216-218, and output layer 206 includes a node 222. In this example, each node in a layer is connected to every node in an adjacent layer. For example, node 208 in input layer 202 is connected to both of nodes 216 and 218 in hidden layer 204. Similarly, node 216 in the hidden layer is connected to all of nodes 208-214 in input layer 202 and node 222 in output layer 206. Although only one hidden layer is shown for neural network 200, it has been contemplated that neural network 200 used to implement the machine learning model for prohibited transaction detection may include as many hidden layers as desired.

In this example, neural network 200 receives a set of input values and produces an output value. Each node in input layer 202 may correspond to a distinct input value. For example, when neural network 200 is used to implement the machine learning model for prohibited transaction detection, each node in the input layer 202 may correspond to a distinct attribute derived from the information associated with a transaction (e.g., a transaction time, currency amount, USD equivalent amount, balance affect or account balance, local or general time/date, etc.). In a non-limiting example, node 208 may correspond to an account identifier or name, node 210 may correspond to a network address used by a sending or receiving account, node 212 may correspond to an amount for the transaction, and node 214 may correspond to an encoded value representing a set of additional values derived from training data 230.

In some embodiments, each of nodes 216-218 in hidden layer 204 generates a representation, which may include a mathematical computation (or algorithm) that produces a value based on the input values received from nodes 208-214. The mathematical computation may include assigning different weights to each of the data values received from nodes 208-214. Nodes 216 and 218 may include different algorithms and/or different weights assigned to the data variables from nodes 208-214 such that each of nodes 216 and 218 may produce a different value based on the same input values received from nodes 208-214. In some embodiments, the weights that are initially assigned to the features (or input values) for each of nodes 216 and 218 may be randomly generated (e.g., using a computer randomizer). The values generated by nodes 216 and 218 may be used by node 222 in output layer 206 to produce an output value for neural network 200. When neural network 200 is used to implement the machine learning model for prohibited transaction detection, the output value produced by neural network 200 may indicate a likelihood that a transaction is prohibited (e.g., a malicious, fraudulent, or illegal transaction).

Neural network 200 may be trained by using training data. By providing training data 230 to neural network 200, nodes 216 and 218 in hidden layer 204 may be trained (adjusted) such that an optimal output (e.g., a classification) is produced in output layer 206 based on the training data. By continuously providing different sets of training data, and penalizing neural network 200 when the output of neural network 200 is incorrect (e.g., when the determined (predicted) prohibited transaction is actually valid, such as a false positive designated by an agent), neural network 200 (and specifically, the representations of the nodes in hidden layer 204) may be trained (adjusted) to improve its performance in data classification. Adjusting neural network 200 may include adjusting the weights associated with each node in hidden layer 204.

Figure 3A:
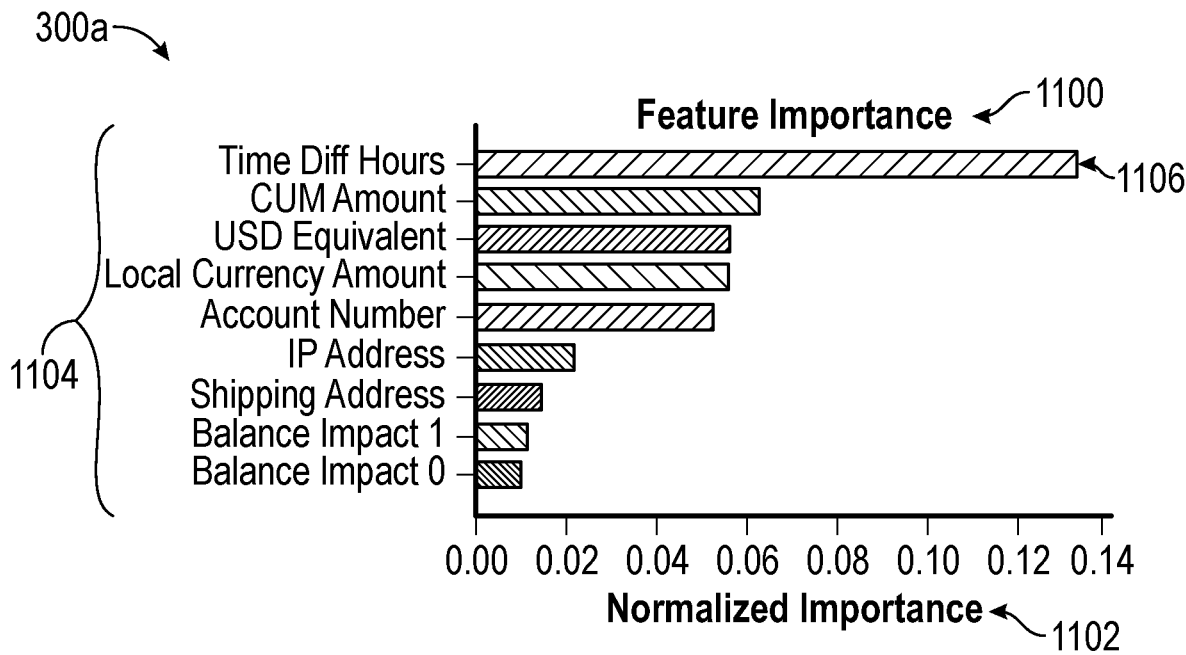
FIG. 3A is an exemplary feature importance of decision made by a machine learning engine trained for prohibited transaction detection, according to an embodiment.

FIG. 3A is an exemplary feature importance of decision made by a machine learning engine trained for prohibited transaction detection, according to an embodiment. In this regard, model prediction explainer 300a in FIG. 3A includes feature importance 1100 that provides output values showing different feature importance for a machine learning model in making particular decisions, such as flagging a transaction as potentially prohibited due to laws, regulations, or other requirements (e.g., money laundering transactions). Feature importance 1100 may provide an analysis of features within a specific machine learning model trained using training data sets for transactions and an algorithm, such as gradient boosting or random forest. Feature importance 1100 in gradient boosting may provide a score that indicates the value or usefulness of each feature from the training data set in construction and decision-making within the decision trees of the machine learning model. This allows different attributes or features in the dataset (e.g., the attributes or features to transactions within the training data) to be ranked and compared when the trained machine learning model is making decisions and classifying data, such as flagging transactions as potentially prohibited. Importance of particular features may be determined by an amount or factor that each feature affects or improves the performance measure of the model, which may be weighted by the number of observations for a node. When using gradient boosting or random forest, this may also be averaged over the individual trees.

Thus, feature importance 1100 allows for an explanation of why a particular model is making certain decisions and the features of the underlying data that is utilized to make a classification. In this regard, a normalized importance 1102 may show a value of each particular factor in making a particular decision. Model prediction explainer 300a shows different features 1104 that are used to make decisions by the model, and the effect that each of features 1104 has to the model when making a decision. For example, features 1104 include at least a "time difference (in hours)," a "cumulative amount," a "USD equivalent value," a "local currency amount," an "account number," an "IP address," a "shipping address," and a "balance impact" on one or more of the accounts in the transaction (e.g., 1 or 0). As shown, a time difference 1106 feature or attribute is ranked as the most important feature in decision-making for the machine learning model explained by model prediction explainer 300a. This prediction explainer is further discussed in reference to FIG. 3B.

Figure 3B:
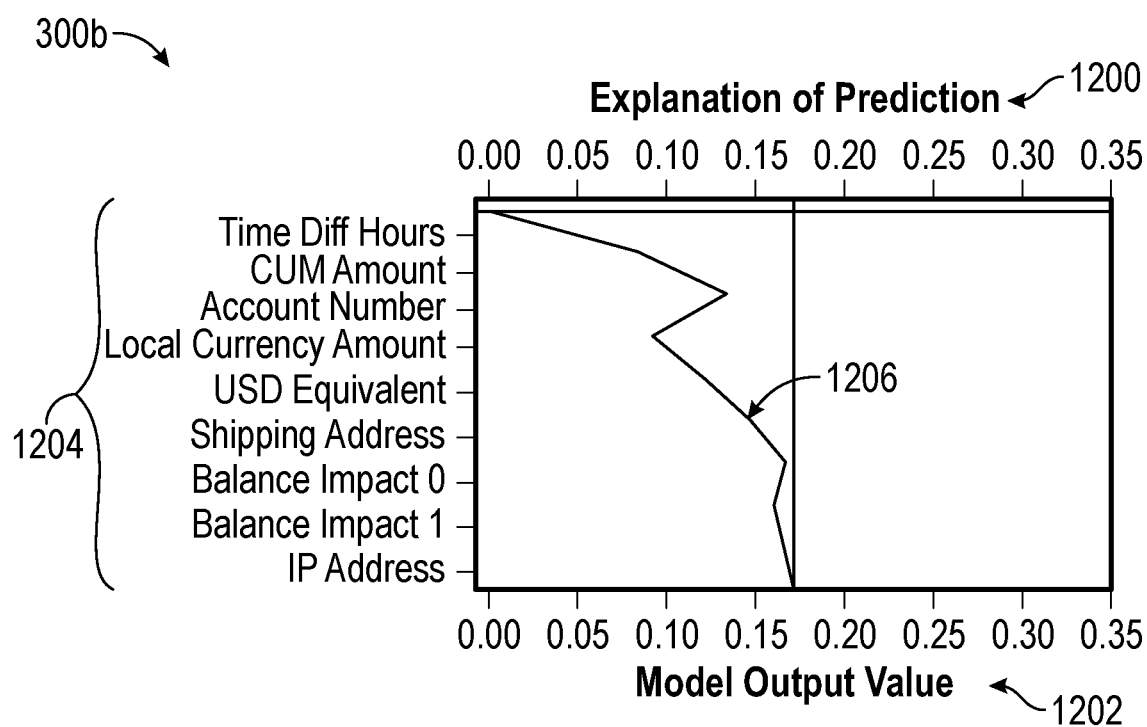
FIG. 3B is an exemplary explanation graph of a machine learning engine trained for prohibited transaction detection, according to an embodiment.

FIG. 3B is an exemplary explanation graph of a machine learning engine trained for prohibited transaction detection, according to an embodiment. A machine learning prediction explainer may be used to show explanation output graph 300b to explain why a machine learning model has taken or performed a decision based on feature importance 1100 in model prediction explainer 300a. For example, model output value 1202 shows an effect on a prediction by each feature of features 1204 (corresponding to features 1104 in FIG. 3A), where the effect on the prediction may be positive or negative and weighted depending on their overall feature importance. For example, a model decision-making effect 1206 shows each of features 1204 effect on model output value 1202. This further shows whether the feature causes a positive or negative effect in performing a classification of a data point (e.g., transaction) into a particular classifier (e.g., flagged or potentially prohibited transaction). Using model prediction explainer 300a and/or explanation output graph 300b, a narrative may be generated for a particular decision that the machine learning model makes after being trained on the training data and any false positive feedback by agents reviewing flagged transactions.

For example, using the data provided in FIG. 3A and/or FIG. 3B, a pattern of potentially prohibited transaction(s) may be detected for one or more accounts. A transaction and/or account performing the transactions may be flagged through use of the machine learning model and network discussed herein. In this regard, when flagging the transaction and/or account, explanation output graph 300b or another explanation output graph (e.g., for another model) may be utilized that assist in generating a textual narrative according to the feature importance and decision-making performed by the machine learning model for the transaction(s). An exemplary narrative may appear as follows:

Account #1234xxxxxxx5678. Summary: The BUSINESS account was created on Mar. 18, 2011. The name of the business is MERCHANT A. The account receives payments utilizing the following products: Express Checkout Payment and General Payment and sends payments using Express Checkout Payment.

Transactions involving the account: A total of 49 transactions took place between Oct. 1, 2016 and May 1, 2017 with 48 payments received and 1 payment sent. During this timeframe, the sent transaction made up a total of $39.99 USD and received transactions made up a total of $1,602.50 USD. 79.59% of transactions are categorized as personal. The average amount of $33.39 USD was received and the average amount of $39.99 USD was sent.

The top 2 transaction types received were Express Checkout Payment and General Payment. Express Checkout Payment's highest payment received was "Soccer Jersey-Black" for $99.80 USD. General Payment's highest payment received was "Payment Sent" for $20.00 USD. The top transaction type sent was Express Checkout Payment. Express Checkout Payment's highest payment sent was "eTextbook-ebook" for $39.99 USD. Some received transactions were domestic in nature making up approximately 4.17% of transactions totaling $40.00 USD and 0.00% of sent transactions were domestic, totaling $0.00 USD. The highest concentration of payments was received from USER A (9876xxxxxxxxxx4321), indicating the payment was for "Payment Sent."

As shown above, the narrative explanation takes particular features of the feature importance and effect on prediction of the features provided by the machine learning prediction explainer. This may include the top feature contributing to the model prediction and/or the top feature detected in the particular transaction(s) as causing the classification of the transaction(s) and/or account as potentially engaging in prohibited behavior. The features may also correspond to a number of the top ranked features (e.g., the top three or five features contributing to a decision) or may make a sampling of a set of the positive and negative features to decision-making. The narrative further shows textual information of the explanation output graph for a machine learning prediction explainer, which allows an agent to quickly review the transaction(s) and determine whether this is a false positive. For example, the agent may view that the payments received were for soccer jerseys and the user was purchasing text books, indicating a possible student and therefore unlikely to be involved in money laundering. Thus, the agent may indicate this is a false positive.

Another exemplary narrative may be as follows:

Account #4321xxxxxxxxxx7890 Summary: The BUSINESS account was created on May 1, 2018. The name of the business is FOOD LTD. The account receives payments utilizing the following product: Website Payments. Transactions: A total of 5,000 transactions took place between Jun 1, 2018 and Sep 1, 2018 with 5,000 payments received and 0 payments sent. During this timeframe, sent transactions made up a total of $0.00 USD and received transactions made up a total of $600,000.00 USD. 37.19% of transactions are categorized as personal. The average amount of $120.00 USD was received and the average amount of $0.00 USD was sent.

The top transaction type received was Website Payment. Website Payment's highest payment received was "FOOD LTD" for $8,650.62 USD. The majority of received transactions were domestic in nature making up approximately 97.49% of transactions totaling $550,000.00 USD and 0.00% of sent transactions were domestic, totaling $0.00 USD. The highest concentration of payments were received from USER B (5678xxxxxxxxxx0987), indicating the payments were for "Food items."

In the preceding example, due to the number of transactions with no sent transactions, as well as other features of the transactions, the transactions and account may be properly flagged for review and/or indicating prohibited transactions and conduct. Thus, the narrative may assist an agent in determining that these were properly flagged by the machine learning model.

Figure 4:
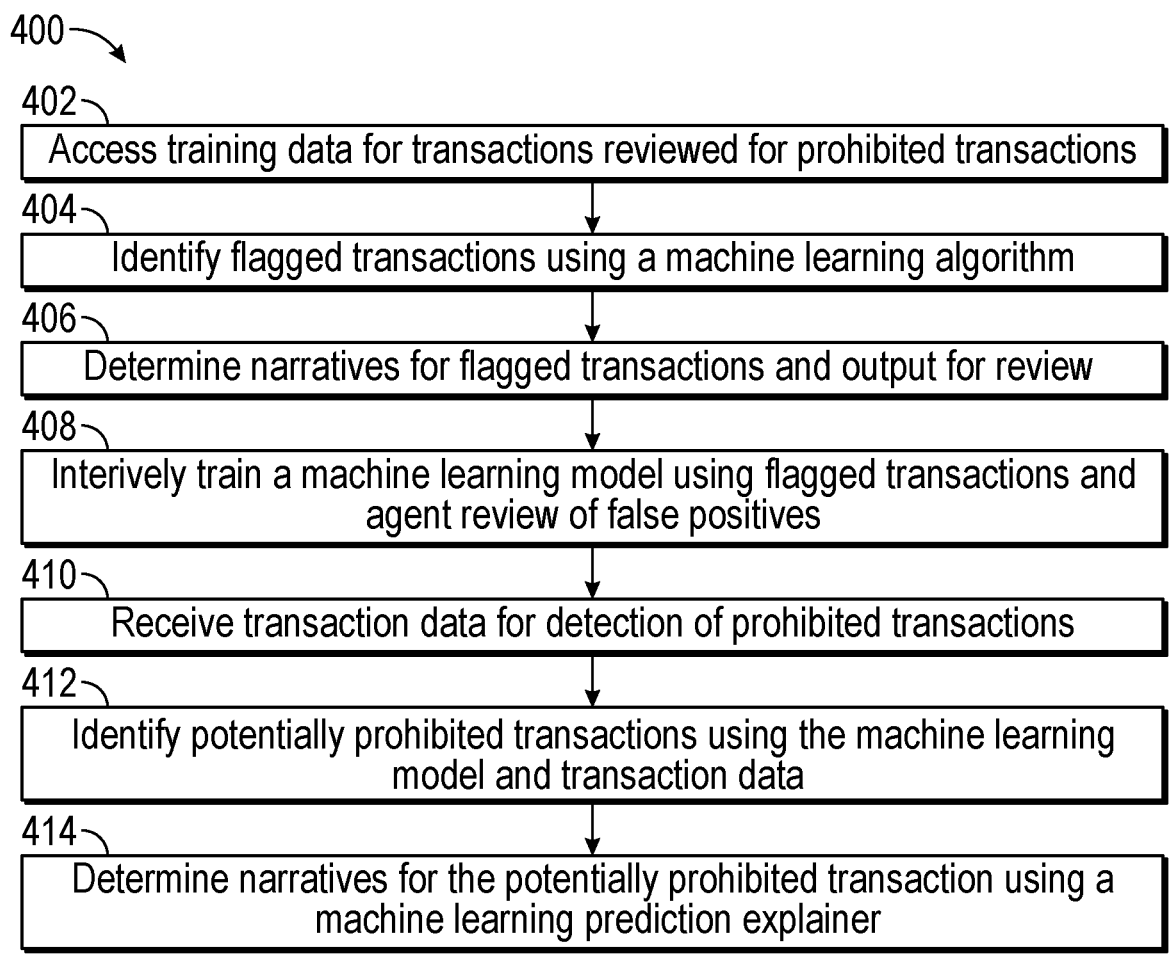
FIG. 4 is a flowchart of a machine learning model and narrative generator for prohibited transaction detection and compliance, according to an embodiment.

FIG. 4 is a flowchart 400 of a machine learning model and narrative generator for prohibited transaction detection and compliance, according to an embodiment. Note that one or more steps, processes, and methods described herein of flowchart 400 may be omitted, performed in a different sequence, or combined as desired or appropriate.

At step 402 of flowchart 400, training data for transaction reviewed for prohibited transactions is accessed. The training data may correspond to data sets having different data points (e.g., transactions) that may be processed or accessible to an entity, such as those processed by an online transaction processor, financial entity, or other payment processor. In this regard, the training data may include different features and/or attributes, where these describe the transactions and allow for decision-making based on the transactions. In some embodiments, classifiers for the data may be designated (e.g., "prohibited transactions") and/or the data sets may be annotated or labeled with particular transactions flagged as prohibited. The training data may therefore include data that may be processed by agents of the service provider or other entity to determine whether any of the transactions indicate money laundering or other prohibited behavior. Moreover, the training data may also include transaction data processed by the regulatory agency of those transactions that are actually prohibited (e.g., a legal or other action has been or will be taken by the agency) and those that are not prohibited or do not rise to the degree of prohibited behavior to cause an action. Thus, such data may be labeled.

Using the training data, at step 404, flagged transactions are identified using a machine learning algorithm. The machine learning algorithm may be supervised (e.g., where the classifiers for the data points are known) and may correspond to gradient boosting and/or random forest that use combinations and/or averages of different decision trees for generation of a machine learning model by processing the training data to recognize patterns and/or group specific transactions according to their features. When identifying flagged transactions, the supervised machine learning algorithm and process may be used to initial make predictions and generate a model, which may output which transactions within the training data set are flagged for potentially prohibited behavior. When implementing the trained machine learning model through a neural network, the input values may be used for transactions to form an output, which may correspond to whether the transaction is flagged or not as prohibited.

In order to determine whether transactions flagged by the initially trained model include false positives (e.g., for iterative and/or continuous model retraining), an explanation of the particular flagged transactions may be required. Thus, narratives for flagged transactions are determined and output for review, such as to an agent associated with reporting prohibited transactions to a regulatory agency, at step 406. To generate the narratives, a machine learning prediction explainer may be utilized to output a feature importance graph or other displayable format of the overall importance, ranking, or value to each feature in causing a particular classification by the machine learning model. The feature importance may include a value that the feature contributes to certain decision-making, allowing a view of which features are the most important and comparing features in machine learning decisions by the model. An explanation output graph may further be utilized to determine the positive and negative impacts or effects on the prediction by each feature, as well as the amount of the particular positive or negative effect to the decision-making of the model.

Using the explanation output graph, the narratives may be generated. The narratives may include different information associated with the transactions and/or accounts to allow identification of the particular transactions and/or accounts, as well as provide context to an agent reviewing the flagged transactions. The narratives may also provide information on the features of the transactions that caused flagging, which may be ranked or selected based on the feature importance. For example, if a feature importance shows account age (e.g., length account is open) or transaction amount as the highest feature to decision-making, then the account age or transaction amount may be displayed. Where the feature is not available or does not apply to the particular transaction, the next highest feature may be selected. Further, both positive and negative effecting features may be displayed, as well as a number based on ranking or importance. The narrative may provide a textual output having the particular data in readable form so that the output graphs are not required to be reviewed but instead the narrative may be read to determine whether the transactions were properly flagged or may be false positives. Thus, an agent may provide feedback on what is properly flagged.

At step 408, a machine learning model is then iteratively trained using the flagged transactions and agent review of the false positives identified in the flagged transactions. Iteratively training may allow for retraining, adjusting weights and/or values of nodes with trees and/or hidden layers, and otherwise adjust the machine learning model to make better or different predictions, such as to lower or remove false positives. Once the machine learning model is trained, the machine learning model may be provided and/or output to one or more entities for prediction of prohibited transactions and generation of narratives. For example, an entity (e.g., the service provider or transaction processor training the model using the training data of transactions for the entity) may implement the model within a machine learning engine and prohibited transaction detector. Thereafter, the network, engine, or other detector implementing the model may receive transaction data for detection of prohibited transactions, at step 410.

Potentially prohibited transactions are then identified in the transaction data using the machine learning model that has been iteratively trained using the supervised machine learning algorithm, at step 412. The potentially prohibited transactions may be identified using the trained model and the particular nodes, values, and weights of the decision-making layers. The potentially prohibited transactions may be identified based on the features of the transactions and further on the training of the classifiers by the machine learning algorithm when generating the model. Once those potentially prohibited transactions are identified, at step 414, narratives are determined for the potentially prohibited transactions using the machine learning prediction explainer and a narrative generator. This further uses the explanation output graph that includes data of how the features contribute to the decision-making of the model. This may then be displayed to an agent for review and/or submission of the transactions identified as potentially prohibited to the regulatory agency. Moreover, additional false positives may be identified by an agent when utilizing the model, which may be used for further model optimization in an attempt to remove false positives.

Figure 5:
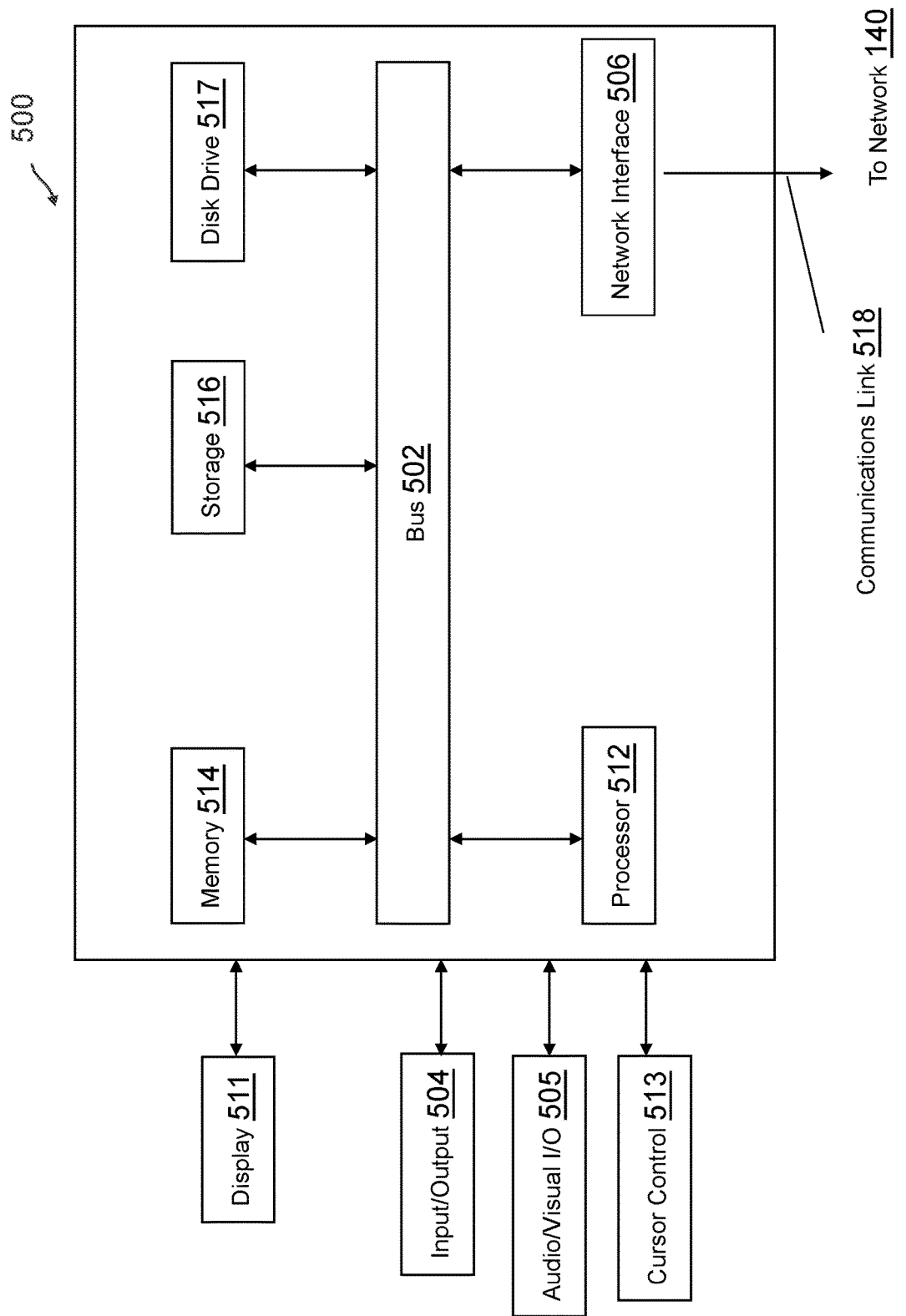
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/ output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a non-transitory memory; and
   one or more hardware processors coupled to the non-transitory memory and configured to read instructions from the non-transitory memory to cause the system to perform operations comprising:
   receiving transaction data for processed transactions;
   determining a machine learning (ML) model trained for prohibited transaction pattern detection using a training data set;
   determining a first prohibited transaction within the transaction data using the ML model and features of the transaction data, wherein the first prohibited transaction is determined by the ML model based on one or more values associated with the features, and wherein the one or more values are computed by the ML model using the prohibited transaction pattern detection;
   generating a machine learning prediction explainer for the determining the first prohibited transaction using the ML model;
   determining, based on the machine learning prediction explainer, the one or more values of the features used by the machine learning model for the determining the first prohibited transaction;
   generating readable text that explains a contribution of each of the features to the determining the first prohibited transaction, wherein the readable text is generated based on the one or more values and the transaction data;
   generating a textual narrative associated with the first prohibited transaction based on an output of the machine learning prediction explainer and the readable text that includes the one or more values;

determining whether the first prohibited transaction within the transaction data is determined to be a false positive by the ML model based at least on the textual narrative;

generating data usable to retrain the ML model for the prohibited transaction pattern detection based at least on the determining whether the first prohibited transaction is determined to be the false positive; and retraining the ML model for the prohibited transaction pattern detection based on the data generated, wherein retraining the ML model comprises adjusting at least one model weight used by the ML model based on the data to reduce a likelihood of the false positive by the ML model.

2. The system of claim 1, wherein determining the first prohibited transaction comprises generating a review flag for the first prohibited transaction with a flag type indicating a reason for prohibiting the first prohibited transaction.

3. The system of claim 2, wherein the textual narrative further comprises a textual conversion of an output graph for the machine learning prediction explainer of the at least one of the features for the first prohibited transaction, and wherein the output graph shows a feature importance of the at least one of the features in causing the determining the first prohibited transaction based on the one or more values.

4. The system of claim 2, wherein the operations further comprise:

receiving an agent response to the textual narrative, the agent response identifying the false positive for the first prohibited transaction; and modifying the review flag and the flag type based on the agent response and the false positive.

5. The system of claim 1, wherein retraining the ML model further comprises:

in response to the first prohibited transaction being the false positive, triggering an iterative training of the ML model based on the false positive.

6. The system of claim 5, wherein the iterative training of the ML model is triggered based on a set of false positive indications including the false positive indication for the first prohibited transaction and one or more previous false positive indications for one or more previous prohibited transactions.

7. The system of claim 1, wherein retraining the ML model further comprises:

in response to the first prohibited transaction being the false positive, incorporating the false positive into a continuous model retraining.

8. A method comprising:

receiving transaction data for processed transactions;

determining a machine learning (ML) model trained for prohibited transaction pattern detection using a training data set;

determining a first prohibited transaction within the transaction data using the ML model and features of the transaction data, wherein the first prohibited transaction is determined by the ML model based on one or more values associated with the features, and wherein the one or more values are computed by the ML model using the prohibited transaction pattern detection;

generating a machine learning prediction explainer for the determining the first prohibited transaction using the ML model;

determining, based on the machine learning prediction explainer, the one or more values of the features used by the machine learning model for the determining the first prohibited transaction;

generating readable text that explains a contribution of each of the features to the determining the first prohibited transaction, wherein the readable text is generated based on the one or more values and the transaction data;

generating a textual narrative associated with the first prohibited transaction based on an output of the machine learning prediction explainer and the readable text that includes the one or more values;

determining whether the first prohibited transaction within the transaction data is determined to be a false positive by the ML model based at least on the textual narrative;

generating data usable to retrain the ML model for the prohibited transaction pattern detection based at least on the determining whether the first prohibited transaction is determined to be the false positive; and retraining the ML model for the prohibited transaction pattern detection based on the data generated, wherein retraining the ML model comprises adjusting at least one model weight used by the ML model based on the data to reduce a likelihood of the false positive by the ML model.

9. The method of claim 8, wherein determining the first prohibited transaction comprises generating a review flag for the first prohibited transaction with a flag type indicating a reason for prohibiting the first prohibited transaction.

10. The method of claim 9, wherein the textual narrative further comprises a textual conversion of an output graph for the machine learning prediction explainer of the at least one of the features for the first prohibited transaction, and wherein the output graph shows a feature importance of the at least one of the features in causing the determining the first prohibited transaction based on the one or more values.

11. The method of claim 9, further comprising:

receiving an agent response to the textual narrative, the agent response identifying the false positive for the first prohibited transaction; and modifying the review flag and the flag type based on the agent response and the false positive.

12. The method of claim 8, wherein retraining the ML model further comprises:

in response to the first prohibited transaction being the false positive, triggering an iterative training of the ML model based on the false positive.

13. The method of claim 12, wherein the iterative training of the ML model is triggered based on a set of false positive indications including the false positive indication for the first prohibited transaction and one or more previous false positive indications for one or more previous prohibited transactions.

14. The method of claim 8, wherein retraining the ML model further comprises:

in response to the first prohibited transaction being the false positive, incorporating the false positive into a continuous model retraining.

15. A non-transitory machine-readable medium having instructions stored thereon that are executed by a computer system to perform operations comprising:

receiving transaction data for processed transactions;

determining a machine learning (ML) model trained for prohibited transaction pattern detection using a training data set;

determining a first prohibited transaction within the transaction data using the ML model and features of the transaction data, wherein the first prohibited transaction is determined by the ML model based on one or more values associated with the features, and wherein the one or more values are computed by the ML model using the prohibited transaction pattern detection;

generating a machine learning prediction explainer for the determining the first prohibited transaction using the ML model;

determining, based on the machine learning prediction explainer, the one or more values of the features used by the machine learning model for the determining the first prohibited transaction;

generating readable text that explains a contribution of each of the features to the determining the first prohibited transaction, wherein the readable text is generated based on the one or more values and the transaction data;

generating a textual narrative associated with the first prohibited transaction based on an output of the machine learning prediction explainer and the readable text that includes the one or more values;

determining whether the first prohibited transaction within the transaction data is determined to be a false positive by the ML model based at least on the textual narrative;

generating data usable to retrain the ML model for the prohibited transaction pattern detection based at least on the determining whether the first prohibited transaction is determined to be the false positive; and retraining the ML model for the prohibited transaction pattern detection based on the data generated, wherein retraining the ML model comprises adjusting at least one model weight used by the ML model based on the data to reduce a likelihood of the false positive by the ML model.

16. The non-transitory machine-readable medium of claim 15, wherein determining the first prohibited transaction comprises generating a review flag for the first prohibited transaction with a flag type indicating a reason for prohibiting the first prohibited transaction.

17. The non-transitory machine-readable medium of claim 16, wherein the textual narrative further comprises a textual conversion of an output graph for the machine learning prediction explainer of the at least one of the features for the first prohibited transaction, and wherein the output graph shows a feature importance of the at least one of the features in causing the determining the first prohibited transaction based on the one or more values.

18. The non-transitory machine-readable medium of claim 16, wherein the operations further comprise:
receiving an agent response to the textual narrative, the agent response identifying the false positive for the first prohibited transaction; and
modifying the review flag and the flag type based on the agent response and the false positive.

19. The non-transitory machine-readable medium of claim 15, wherein retraining the ML model further comprises:
in response to the first prohibited transaction being the false positive, triggering an iterative training of the ML model based on the false positive.

20. The non-transitory machine-readable medium of claim 19, wherein the iterative training of the ML model is triggered based on a set of false positive indications including the false positive indication for the first prohibited transaction and one or more previous false positive indications for one or more previous prohibited transactions.

* * * * *